(12) United States Patent
Kitagata

(10) Patent No.: US 9,557,945 B2
(45) Date of Patent: Jan. 31, 2017

(54) INFORMATION PROCESSING SYSTEM, PRINT SYSTEM, SERVER APPARATUS, AND METHOD FOR CONTROLLING INFORMATION PROCESSING SYSTEM

(71) Applicant: CANON KABUSHIKI KAISHA, Tokyo (JP)

(72) Inventor: Kei Kitagata, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/961,539

(22) Filed: Dec. 7, 2015

(65) Prior Publication Data

US 2016/0170697 A1 Jun. 16, 2016

(30) Foreign Application Priority Data

Dec. 12, 2014 (JP) ................. 2014-251896

(51) Int. Cl.
G06F 3/12 (2006.01)
G06F 17/30 (2006.01)
G06K 15/02 (2006.01)

(52) U.S. Cl.
CPC .......... *G06F 3/1247* (2013.01); *G06F 3/1206* (2013.01); *G06F 3/1238* (2013.01); *G06F 3/1287* (2013.01); *G06F 3/1292* (2013.01); *G06F 17/3012* (2013.01); *G06K 15/02* (2013.01)

(58) Field of Classification Search
USPC ....................................... 358/1.15
See application file for complete search history.

(56) References Cited

U.S. PATENT DOCUMENTS

2013/0332930 A1* 12/2013 Towata ................. G06F 9/4812
718/102

FOREIGN PATENT DOCUMENTS

JP 2003-143567 A 5/2003

OTHER PUBLICATIONS

Masayuki at al., Information Processing System, Information Processor, and Information Processing Method, Recoding Medium, and Program, May 16, 2003, Machine Translated Japanese Patent Applicantion Publication, JP2003143567 listed on IDS, all pages.*

* cited by examiner

*Primary Examiner* — Ngon Nguyen
(74) *Attorney, Agent, or Firm* — Canon USA, Inc., IP Division

(57) ABSTRACT

When an index file includes reference information about a next index file, a printer continues to acquire the next index file until the index file is overwritten with reference information about a newly processed file.

8 Claims, 10 Drawing Sheets

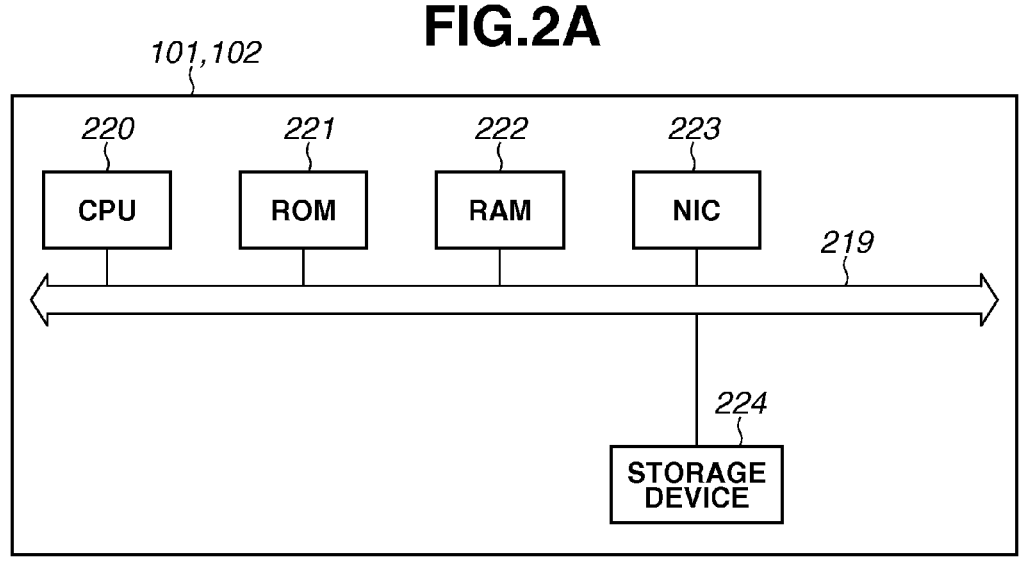
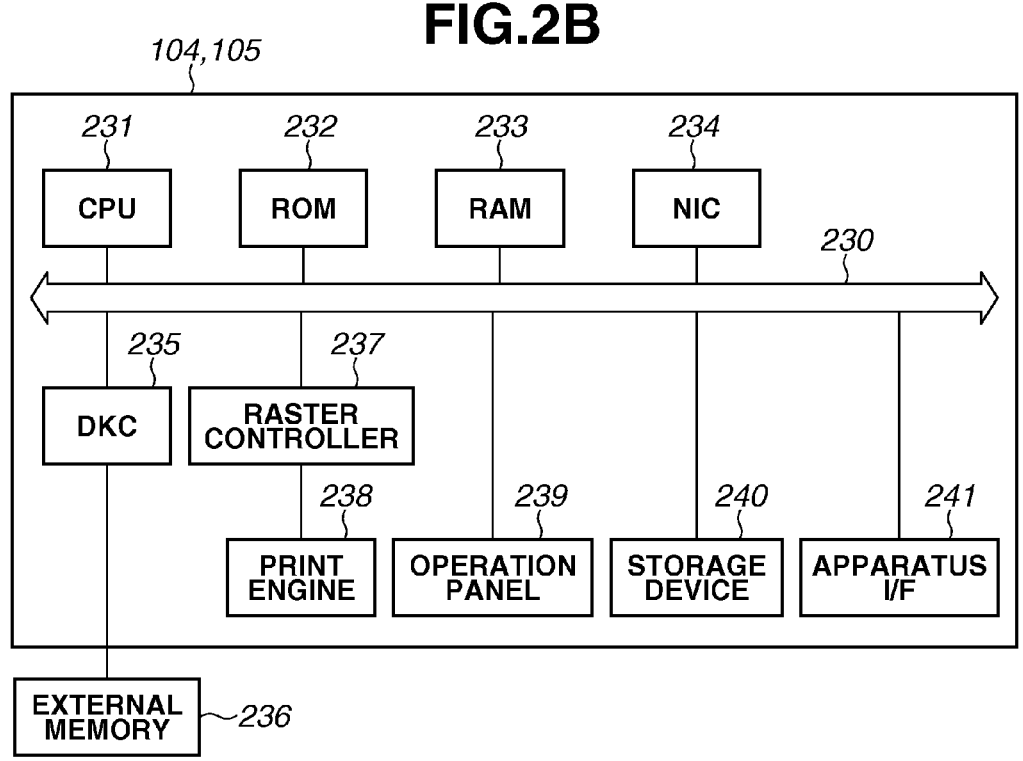

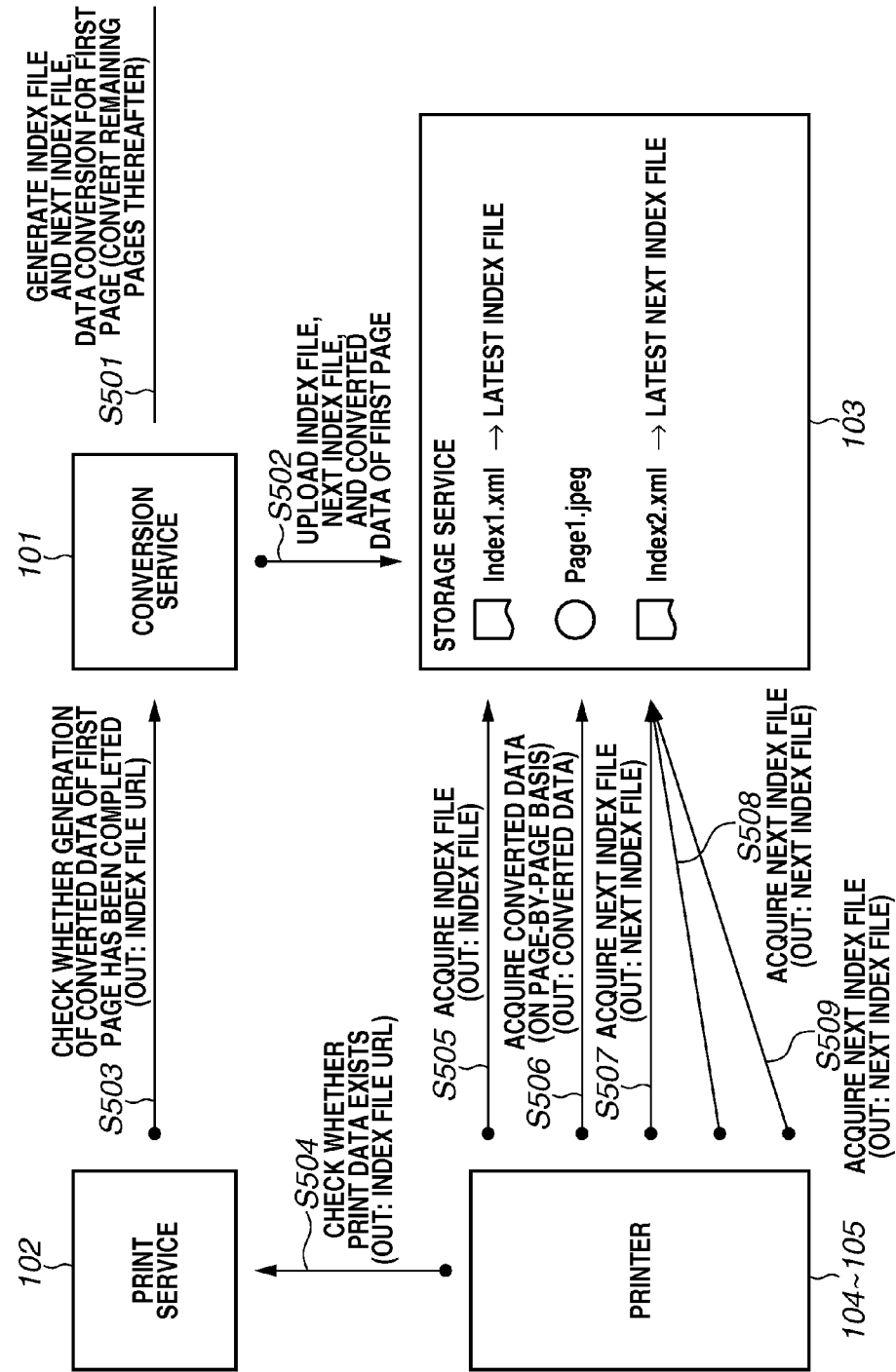

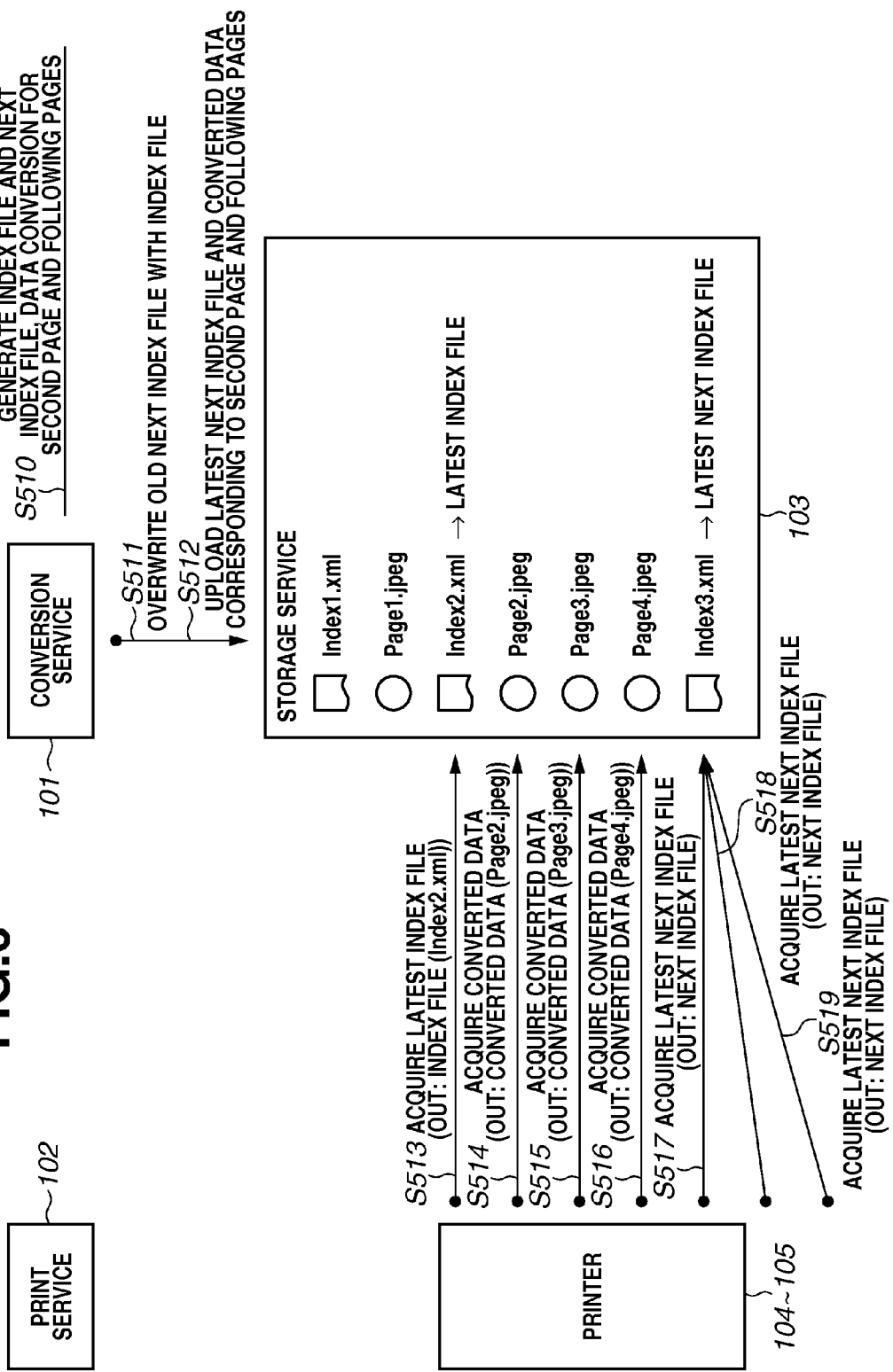

FIG.7A 601

```
INDEX FILE (indexFile.xml)

<property>
    <copies>1</copies>
    <duplex>true</duplex>
</property>
<contents>
    <datapath>
        https://{StorageService}/page1.jpeg
    </datapath>
    <nextpage>
        https://{StorageService}/indexFile2.xml
    </nextpage>
</contents>
```

FIG.7B 601a

```
INDEX FILE (indexFile2.xml)

<property>
    <copies>1</copies>
    <duplex>true</duplex>
</property>
<contents>
    <datapath>
        https://{StorageService}/page2.jpeg
    </datapath>
    <datapath>
        https://{StorageService}/page3.jpeg
    </datapath>
    <datapath>
        https://{StorageService}/page4.jpeg
    </datapath>
    <nextpage>
        https://{StorageService}/indexFile3.xml
    </nextpage>
</contents>
```

FIG.7C 601b

```
INDEX FILE (indexFile3.xml)

<property>
    <copies>1</copies>
    <duplex>true</duplex>
</property>
<contents>
    <datapath>
        https://{StorageService}/page5.jpeg
    </datapath>
    <nextpage>
    </nextpage>
</contents>
```

FIG.7D 602

```
NEXT INDEX FILE (indexFile2.xml)

<property>
    <copies>1</copies>
    <duplex>true</duplex>
</property>
<contents>
    <nextpage>
        https://{StorageService}/indexFile2.xml
    </nextpage>
</contents>
```

FIG.7E 602a

```
NEXT INDEX FILE (indexFile3.xml)

<property>
    <copies>1</copies>
    <duplex>true</duplex>
</property>
<contents>
    <nextpage>
        https://{StorageService}/indexFile3.xml
    </nextpage>
</contents>
```

FIG.7F 603

```
NEXT INDEX FILE (indexFile2.xml)

<property>
    <copies>1</copies>
    <duplex>true</duplex>
</property>
<contents>
    <nextpage>
        https://{dummyConvertService}/indexFile2.xml
    </nextpage>
</contents>
```

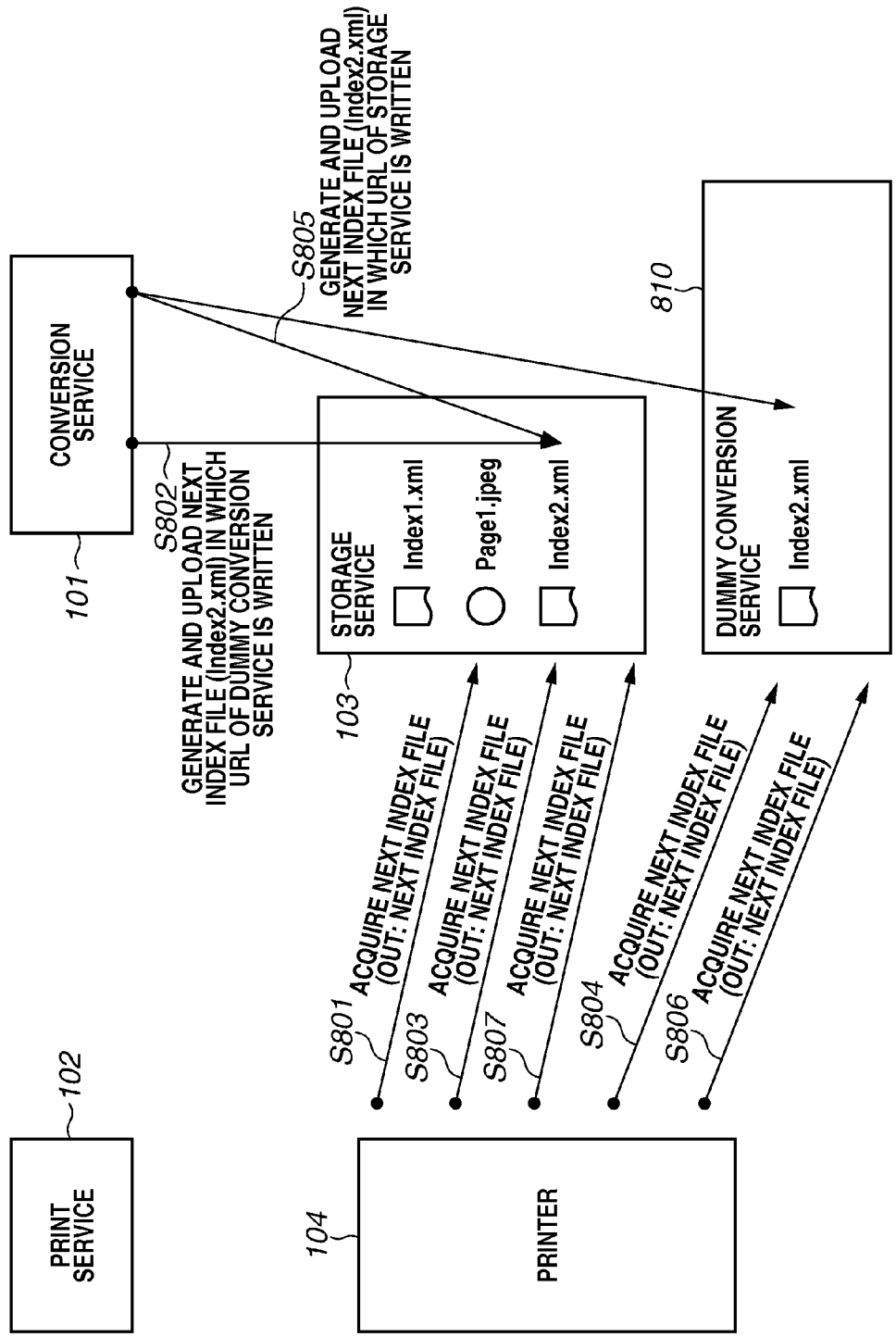

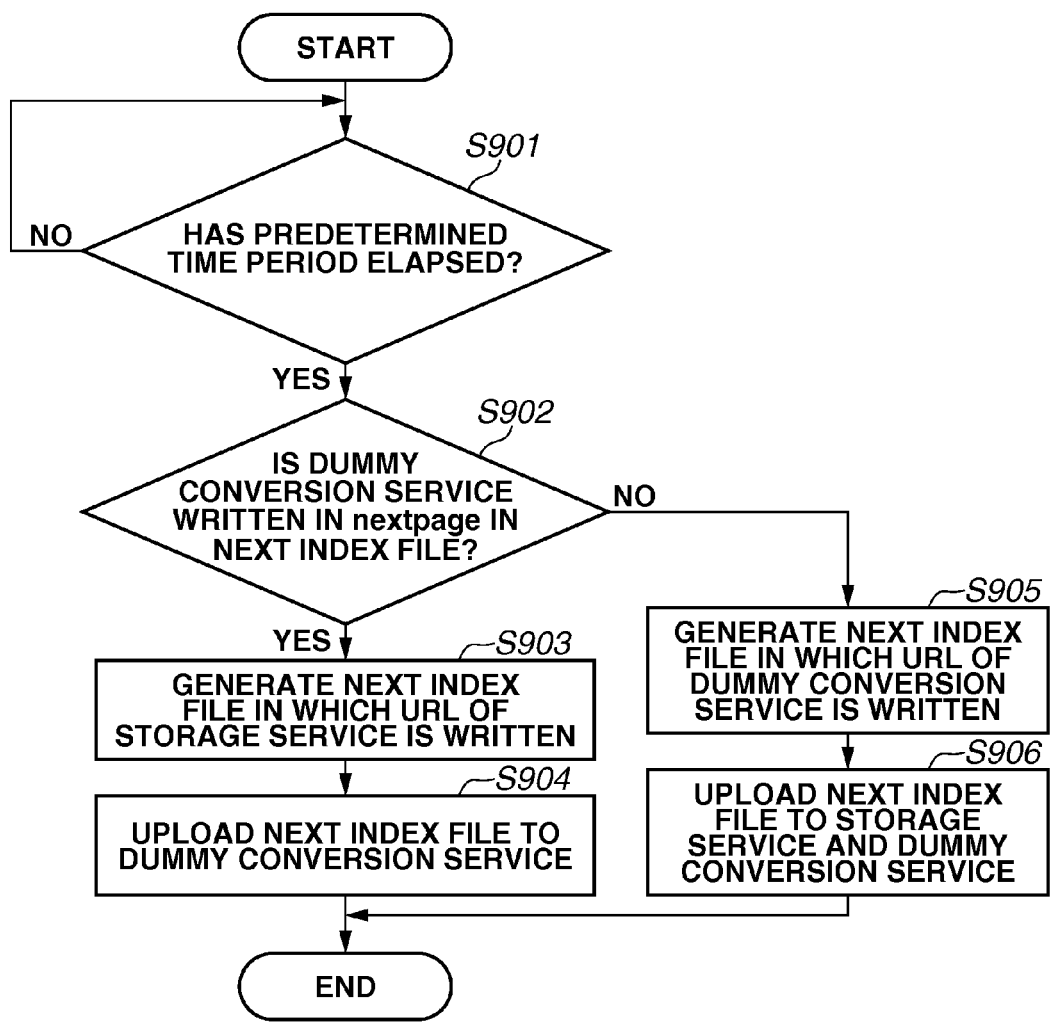

INFORMATION PROCESSING SYSTEM, PRINT SYSTEM, SERVER APPARATUS, AND METHOD FOR CONTROLLING INFORMATION PROCESSING SYSTEM

BACKGROUND

Field

Aspects of the present invention generally relate to an information processing system, a print system, a server apparatus, and a method for controlling the information processing system.

Description of the Related Art

Recently, as cloud services, business in which services are made available on the Internet have been developed. For example, a storage service for storing data in any format through the Internet, a database service for providing a database function, and the like are available. Such a trend has brought about a need for a print server to provide functions as a print service and a data conversion service on the Internet.

When the print service is provided as the cloud service, the print server is provided in a huge datacenter, so that hardware management is not required for each client. Furthermore, a resource can be added easily in accordance with, for example, a load on the server. Moreover, with the cloud service, data processing can be executed in a distributed manner with a large number of computing resources, and requests from a large number of client apparatuses can be simultaneously processed.

In conventional cases, a data conversion driver included in a client apparatus converts a data format into a suitable format for each printer. On the other hand, with the print service operating on the cloud, a cloud print system requiring no client apparatus can be achieved. In this context, the conversion service that converts a data format into a data format interpretable by a wide variety of printers is important. The cloud service can effectively implement functions through cooperation with other services. For example, the following mechanism can be conceived through cooperation between the conversion service that performs the data conversion and the storage service. More specifically, when converted data is provided to a client apparatus, the converted data is stored in the storage service, and is acquired by the client apparatus at a required timing.

In a mechanism in which a cloud print system and a storage service cooperate to provide converted data to a printer, conversion processing, executed by the conversion service, and converted data acquisition processing, executed by the printer, may be carried out in parallel. In such a mechanism, the conversion service may store in the storage service, a file list (URL list) of converted data that is downloadable as a file. Accordingly, the printer may acquire the file and thus acquire the converted data written in the file.

However, in the method described above, when a complete URL list of all the converted data is described at once and is provided to the printer, the printer might make an access to data for which the conversion processing has not been completed. In such a case, the converted data acquisition processing ends in an error due to the absence of the file. When only the URL of the data for which the conversion processing has been completed is described in the URL list, the URL list might be updated before the acquisition processing executed by the printer because the timing at which the URL is accessed is not synchronized between the conversion service and the printer. In such a case, the URL list is updated before the printer acquires the converted data, and thus the printer cannot acquire all the converted data.

In an example of receiving a list including a universal resource locator (URL), Japanese Patent Application Laid-Open No. 2003-143567 discusses that a video camera receives a download list including a universal resource locator (URL) of an access destination to download image data from an image station for the video camera. Then, the video camera accesses the URL corresponding to the image to be downloaded.

SUMMARY

An information processing system according to an aspect of the present invention includes a reception unit configured to receive a request for data processing, a generation unit configured to generate, in a sequential manner, a file list in which reference information about a processed file as a result of the data processing is written, and an acquisition unit configured to acquire the file list and the processed file based on a written content in the file list. In a case where the data processing is not fully completed when the file list is generated, the generation unit is configured to generate another file list in which reference information about a next processed file is written, and write reference information about the another file list in the file list. In a case where a newly processed file is generated, the generation unit is configured to overwrite the another file list with reference information about the newly processed file. In a case where the file list includes the reference information about the another file list, the acquisition unit is configured to continue to acquire the another file list until the another file list is overwritten with the reference information about the newly processed file.

Further features of the present disclosure will become apparent from the following description of exemplary embodiments with reference to the attached drawings.

BRIEF DESCRIPTION OF THE DRAWINGS

FIGS. 2A and 2B are diagrams illustrating examples of hardware configurations of a conversion service and a printer, respectively.

FIG. 5 is a diagram illustrating data conversion processing and converted data acquisition processing.

FIG. 6 is a diagram illustrating the data conversion processing and the converted data acquisition processing.

FIGS. 7A to 7F are diagrams each illustrating an example of an index file.

FIG. 9 is a diagram illustrating data conversion processing and converted data acquisition processing.

FIG. 10 is a diagram illustrating switching to a dummy conversion service.

DESCRIPTION OF THE EMBODIMENTS

Aspects of the present invention are directed to an information processing system in which data processing and acquisition processing for acquiring processed data as a result of the data processing are asynchronously executed, and all the processed data can be acquired while the acquisition processing is prevented from being stopped while the data processing is still in process.

Exemplary embodiments of the present invention are described below with reference to the drawings and the like.

(Overall Configuration of System)

Figure 1:
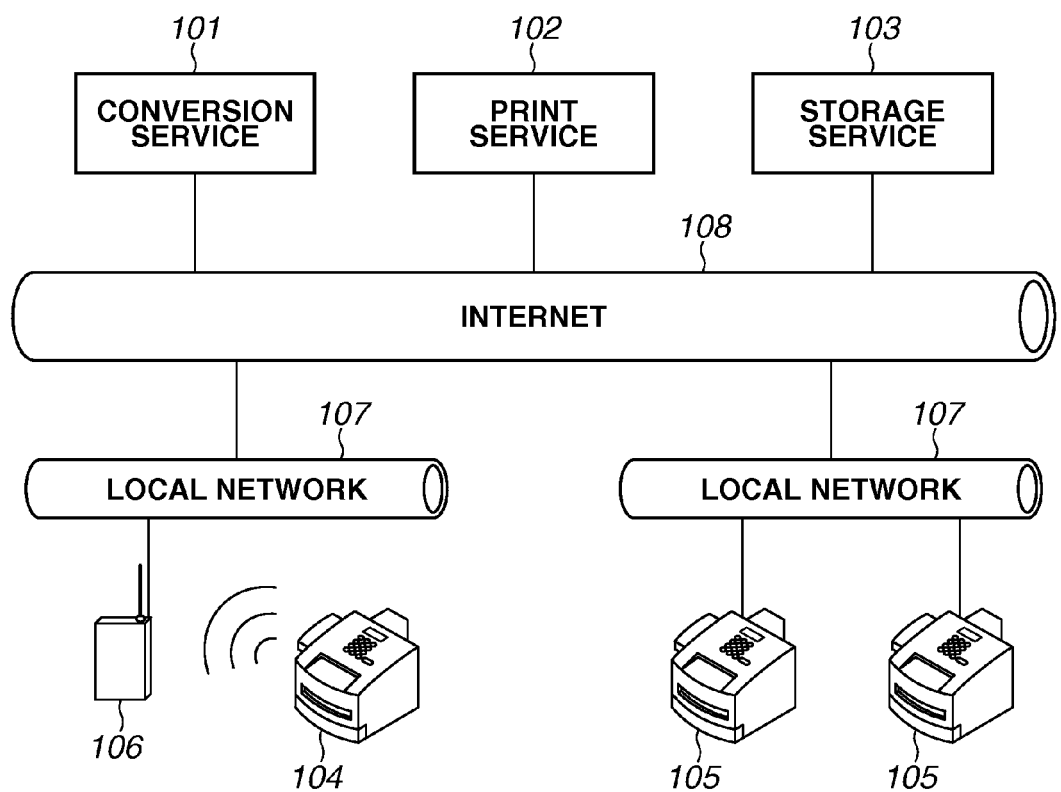
FIG. 1 is a diagram illustrating an overall configuration of a print system according to an exemplary embodiment.

FIG. 1 is a diagram illustrating an overall configuration of a print system as an example of information processing system according to a first exemplary embodiment.

A plurality of printers 104 and 105 are connected through local networks 107. Each of the printers 105 can access the Internet 108 to access a conversion service 101, a print service 102, and a storage service 103, through the corresponding local network 107. The printers 104 and 105 are connected to the local networks 107 through a wired or wireless local area network (LAN). In the present exemplary embodiment, the printer 104 is connected to the corresponding local network 107 through a wireless LAN terminal 106. The wireless LAN terminal 106 is a base station of a wireless LAN having a general network/router function, and provides the wireless LAN in homes and offices.

The print service 102 is a cloud service that receives contents data in another cloud service designated by the printers 104 and 105, or print instruction for the contents data transmitted from a client terminal (not illustrated) through an e-mail or the like. The conversion service 101 is a cloud service that receives a conversion request for the contents data from the print service 102, converts the contents data into data in a format readable by the printers 104 and 105, and provides the converted data thus obtained to the printers 104 and 105.

The print service 102 uploads the contents data to the storage service 103, and the conversion service 101 downloads the contents data from the storage service 103 to receive the contents data. The conversion service 101 uploads the converted data to the storage service 103. The printers 104 and 105 download the converted data from the storage service 103 to receive the contents data. Data is transmitted and received among the conversion service 101, the print service 102, and the storage service 103 through the Internet 108.

(Hardware Configurations of Conversion Service and Print Service)

FIG. 2A is a diagram illustrating a hardware configuration of the conversion service 101 and the print service 102.

Aspects of the present invention can be applied to a single apparatus or a system including a plurality of apparatuses as long as the functions of aspects of the present invention can be implemented. Aspects of the present invention can be also applied to a system in which a connection is realized through a network such as a LAN or a wide area network (WAN), and processing is carried out, as long as the function of the aspects of the present invention can be implemented. In the present exemplary embodiment, components are connected to each other through a system bus 219.

A central processing unit (CPU) 220 is a control device for an information processing apparatus, and executes an application program such as a print system program and an operating system (OS) stored in a storage device 224. The CPU 220 performs control in such a manner that information, a file, and the like, required for executing the program, are stored in a random access memory (RAM) 222. The CPU 220 executes data conversion processing and the like based on a print system program.

A read only memory (ROM) 221 is a storage unit and stores therein a program such as a basic input/output (I/O) program, font data used for data conversion, and various types of data required for print processing and data conversion processing. The RAM 222 is a temporary storage unit and functions as a main memory, a work area, and the like for the CPU 220. The storage device 224 is one external storage unit that functions as a large volume memory. A network interface card (NIC) 223 transmits and receives data to and from an external apparatus. The storage device 224 stores an application program, an OS, and the like.

(Hardware Configuration of Printer)

FIG. 2B is a diagram illustrating an example of a hardware configuration of each of the printers 104 and 105.

Hardware components of each of the printers 104 and 105 are connected to a system bus 230. A CPU 231 controls the entire apparatus, and performs overall control on accesses to various devices connected to the system bus 230. The control is based on a control program and the like stored in the ROM 232, a control program and resource data (resource information) stored in an external memory 236 connected through a disk controller (DKC) 235, and the like. A RAM 233 functions as a main memory, a work area, and the like for the CPU 231. A memory capacity can be expanded with an optional RAM connected to an extension port (not illustrated). A storage device 240 is an external storage unit that functions as a large volume memory.

An operation panel (operation unit) 239 displays a screen or receives an operation instruction from a user through a screen. The operation panel 239 is provided with a button and a display unit such as a liquid crystal panel for setting an operation mode of the printer 104 or 105, displaying an operation state of the printer 104 or 105, and performing an operation for designating contents data to be printed, for example. A NIC 234 transmits and receives data to and from an external apparatus. A print engine 238 employs a known printing technique such as electrophotography (laser beam method), an inkjet method, and a sublimation (thermal transfer) method. A raster controller 237 converts print data in a page description language (PDL) into image data. An apparatus I/F 241 is a connection I/F for an external apparatus connectable through a universal serial bus (USB) and the like.

Figure 3:
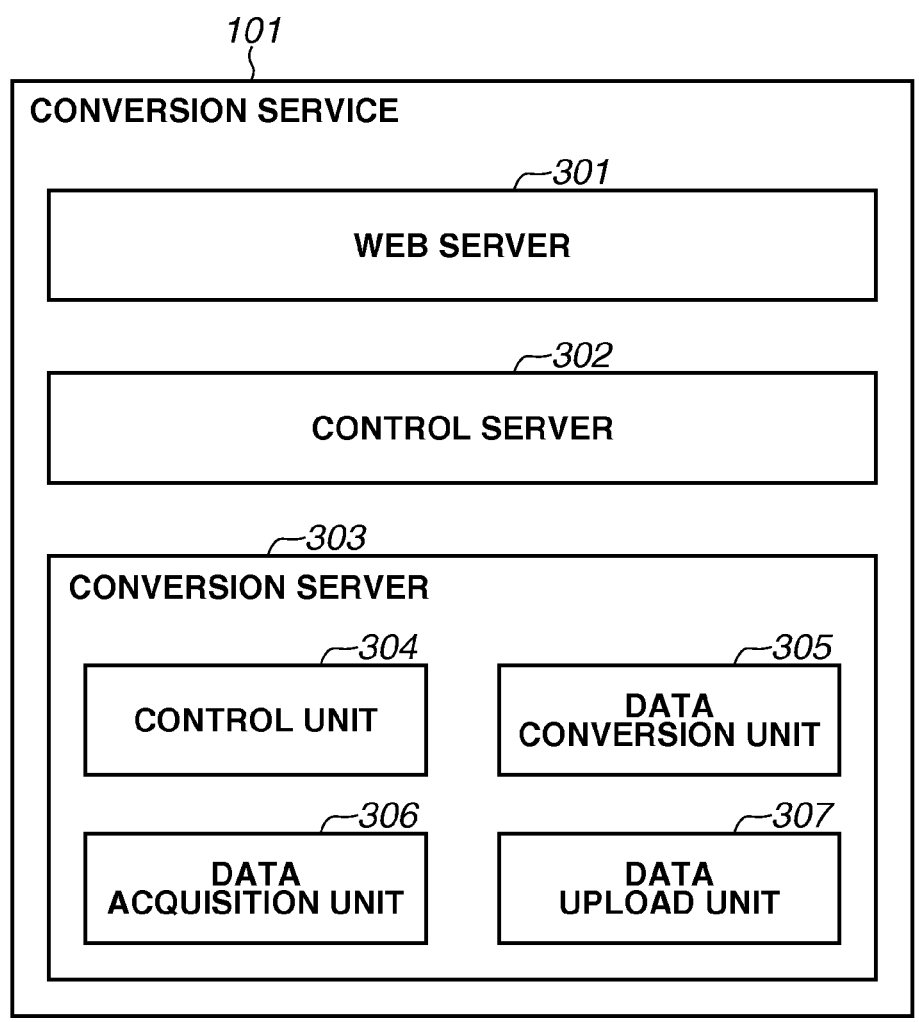
FIG. 3 is a diagram illustrating an example of a module configuration of the conversion service.
Figure 4:
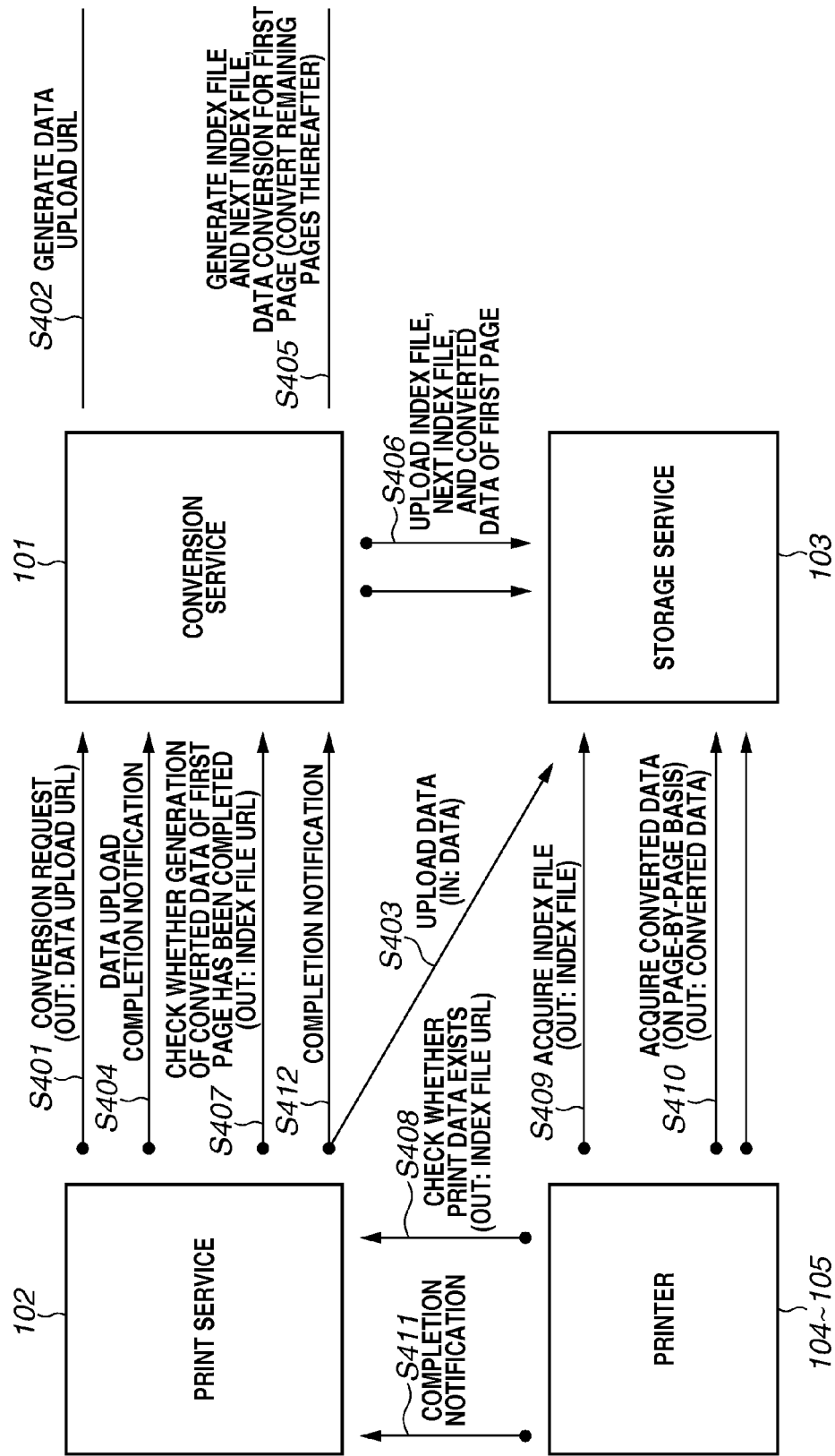
FIG. 4 is a sequence diagram illustrating print processing according to an exemplary embodiment.

Next, print processing for printing contents data in the print system according to the present exemplary embodiment is described with reference to FIGS. 3 and 4. FIG. 3 is a diagram illustrating an example of a module configuration of the conversion service 101. FIG. 4 is a sequence diagram illustrating print processing executed by the conversion service 101, the print service 102, and the printer 104 or 105.

First, contents data that is managed by another cloud service is designated through a user operation on the operation panel 239 of the printer 104 or 105. The contents data to be printed through the print service 102 may be transmitted as data attached to an e-mail. When the contents data is designated on the operation panel 239 of the printer 104 or 105, the designated contents data and information about the other cloud service that manages the contents data are transmitted to the print service 102. The print service 102 acquires the contents data from the other cloud service that manages the designated contents data.

In response to receiving the contents data, the print service 102 transmits a data conversion request, as a request for data processing, to the conversion service 101 in step S401. A Web server 301 of the conversion service 101 receives the data conversion request from the print service 102. The Web server 301 transmits the conversion request to a control server 302.

In step S402, the control server 302 generates a data upload URL for uploading the contents data to the storage service 103. The data upload URL includes a path to a data upload destination and an authorization token for accessing the storage service 103. Processing for adding the authorization token to the data upload URL is executed by a token issuing service (not illustrated) in response to a request from the control server 302. Then, the control server 302 transmits the data upload URL to the print service 102 through the Web server 301.

In step S403, the print service 102 transmits the contents data to the storage service 103 by using the data upload URL as the address. The print service 102 transmits a print property file (not illustrated) including a print property together with the contents data to the storage service 103.

In step S404, the print service 102 transmits a contents data upload completion notification to the Web server 301. When the upload completion notification is received, the Web server 301 transmits the notification to the control server 302. The control server 302 acquires the contents data from the storage service 103 by using the data upload URL as the address, and checks whether data exists. After checking whether the data exists, the control server 302 transmits the conversion request, together with the data upload URL, to the control unit 304. When the data conversion request is received, the control unit 304 acquires the contents data and the print property file from the storage service 103 through the data acquisition unit 306, by using the data upload URL as the address. The control unit 304 stores the contents data and the print property file in the storage device 224, and issues a data conversion instruction to the data conversion unit 305.

In step S405, the data conversion unit 305 analyzes the contents data, and generates a converted data file (processed file) on a page-by-page basis. The converted data file may be an image file, or a PDL file interpretable by the printers 104 and 105. The data conversion unit 305 generates a converted data file of the first page as the first processed file, and then generates a download URL (converted data download URL) of the converted data file of the first page. The converted data download URL includes the path to the converted data download destination and the authorization token for accessing the storage service 103. Processing for adding the authorization token to the URL is executed by a token issuing service (not illustrated) in response to a request from the data conversion unit 305.

The data conversion unit 305 generates an index file as a file list in which reference information (address information) about a processed file is written. More specifically, the data conversion unit 305 generates an index file 601 in which the download URL for the converted data about the first page and print property information, written in the print property file are written. The data conversion unit 305 generates a next index file 602 that is different from the index file 601, which will be described below. The data conversion unit 305 generates the download URL for the index file 601 and the download URL for the next index file 602. These URLs each include a path to the download destination of the index file 601 or the next index file 602 and the authorization token for accessing the storage service 103. Processing for adding the authorization token to the URL is executed by a token issuing service (not illustrated) in response to a request from the data conversion unit 305.

The data conversion unit 305 stores the generated index file 601, the generated next index file 602, and the converted data about the first page in the storage device 224, and transmits a notification indicating that the conversion of the first page is completed to the control unit 304. The data conversion unit 305 transmits the download URL for the index file 601, the download URL for the next index file 602, and the download URL for the converted data to the control unit 304.

In step S406, the control unit 304 uploads the index file 601, the next index file 602, and the converted data file of the first page to the storage service 103 through the data upload unit 307. The control unit 304 notifies the control server 302 of the completion of the generation of the converted data about the first page. The control unit 304 notifies the control server 302 of the download URL for the index file 601.

As described above, in steps S405 and S406, the conversion service 101 converts the data about the first page, and the resultant converted data file is uploaded to the storage service 103. In step S407 and the following steps, the data conversion processing for the second page and the following pages and the uploading of the resultant converted data are sequentially executed, and are asynchronously executed with respect to the data acquisition processing for acquiring converted data executed by the printer 104 or 105. A method for asynchronously executing the data conversion processing and acquisition and print processing for data is described below with reference to FIGS. 5, 6, and 7A to 7F.

In step S407, the print service 102 checks with the Web server 301 whether generation of the converted data about the first page has been completed. Then, the Web server 301 checks with the control server 302 for a first page conversion state. When the notification indicating that the converted data about the first page has been received from the conversion server 303, the control server 302 transmits the download URL for the index file 601 to the Web server 301 as a response. The Web server 301 transmits the download URL for the index file 601 to the print service 102 as a response. The print service 102 periodically checks whether the generation of the converted data about the first page has been completed. The print service 102 stops checking whether the generation of the converted data about the first page has been completed, once the download URL for the index file 601 has been received from the conversion service 101.

In step S408, the printer 104 or 105 checks with the print service 102 whether the print data exists. The printer 104 or 105 periodically checks whether the print data exists. When the generation of the converted data about the first page has been completed, the print service 102 transmits the download URL for the index file 601 as a response to the periodical check of the print data existence performed by the printer 104 or 105.

In step S409, the printer 104 or 105 accesses the storage service 103 by using the download URL for the index file 601 as an access, and acquires the index file 601.

In step S410, the printer 104 or 105 accesses the storage service 103 by using the converted data download URL described in the index file 601 as an address, acquires the converted data on a page-by-page basis, and performs printing. As described above, in steps S409 and 410, the printer 104 or 105 executes acquisition processing for acquiring the index file 601 and acquiring the converted data on a page-by-page basis based on a written content in the index file 601. The data conversion processing executed by the conversion service 101 and the acquisition processing executed by the printer 104 or 105 are asynchronously carried out. The printer 104 or 105 repeatedly executes the acquisition processing until the converted (processed) data for all the pages is acquired. A method for asynchronously executing the data conversion processing and the acquisition and print processing for data is described below with reference to FIGS. 5, 6, and 7A to 7F.

After the printing is completed, in step S411, the printer 104 or 105 transmits a print completion notification to the print service 102.

In step S412, the print service 102 notifies the conversion service 101 of the completion.

The print processing for printing the contents data is as described above. More specifically, the print service 102 transmits the contents data to be printed to the conversion service 101. The conversion service 101 converts the contents data into data in a format printable by the printer 104 or 105. The printer 104 or 105 acquires and prints the resultant converted data in the printable format. The Web server 301, the control server 302, and the conversion server 303 in the conversion service 101 are each an independent program, and these programs can be installed in different information processing apparatuses. In such a case, the programs are installed in the information processing apparatuses connected to corresponding networks, and communications are performed among the programs. The programs can also be installed in a single information processing apparatus.

Next, the method for asynchronously executing the data conversion processing by the conversion serving 101 and the acquisition and print processing for converted data by the printer 104 or 105 is described below with reference to FIGS. 5, 6, and 7A to 7F.

FIGS. 5 and 6 are diagrams (asynchronous data transmission sequences) each illustrating the data conversion processing as well as the acquisition and print processing for converted data executed by the conversion service 101, the print service 102, and the printer 104 or 105, and are diagrams illustrating the processing described with reference to FIG. 4 in detail. FIGS. 7A to 7F are diagrams each illustrating an example of the index file 601.

First, the print service 102 transmits the data conversion request to the conversion service 101. When the data conversion request is received, the conversion service 101 executes processing in steps S501 to S506. The processing in steps S501 to S506 corresponds to the processing in steps S405 to S410 in FIG. 4, and the description thereof will be omitted.

In step S504, the printer 104 or 105 checks with the print service 102 whether the print data exists. The printer 104 or 105 periodically checks whether the print data exists. When the generation of the converted data about the first page has been completed, the print service 102 transmits the download URL of the index file 601 as a response to the periodical check of the print data existence performed by the printer 104 or 105. More specifically, when the conversion service 101 transmits the download URL of the index file to the print service 102 in response to the checking to confirm whether the generation of the converted data of the first page has been completed in step S503, the print service 102 transmits the download URL of the index file 601 as a response. The processing between a point where the print service 102 issues the data conversion request to a point where the printer 104 or 105 acquires the converted data and starts the printing is synchronously executed with the request sources of the processing each checking the processing state in the request destination. On the other hand, the data conversion processing for the second page and the following pages, executed by the conversion service 101, and the acquisition and print processing for the data, executed by the printers 104 and 105, are asynchronously carried out. In this manner, fast printing can be achieved by the printer 104 or 105, and the data conversion processing, and acquisition and print processing for the data of the second page and the following pages executed in parallel.

In step S505, the printer 104 or 105 accesses the storage service 103 by using the download URL of the index file 601 acquired from the print service 102 as an address, and acquires the index file 601. In the present exemplary embodiment, the index file 601 has a data structure in an XML format. The index file 601 includes, as information, a property portion (element) indicating a print property, and a contents portion (element) indicating a download URL (an acquisition destination URL for the converted data on the storage service 103) for converted data about each page. The contents portion includes a nextpage portion indicating the download URL for the next index file. The next index file and the nextpage portion are described below. The conversion service 101 generates the index file 601 from the information including the print property designated by the print service 102 and the converted data download URL on the storage service 103 generated by the conversion service 101.

Now, structures of the index file 601 and the next index file 602 are described. The conversion service 101 and the printer 104 or 105 asynchronously execute the data conversion processing and the acquisition processing for the converted data, respectively. For example, the conversion service 101 might complete the data conversion processing for the second page and the following pages in a state where downloading of the converted data about the first page by the printer 104 or 105 is still in process. At this time, the conversion service 101 might overwrite the written content in the contents portion of the index file 601 with that in an index file 601a in which the converted data download URL for the second page and the following pages is written. As a result, the printer 104 or 105 cannot acquire the converted data about the first page.

On the other hand, the printer 104 or 105 might complete the acquisition and print processing for the converted data about the first page while the data conversion processing for the second page and the following pages performed by the conversion service 101 is still in process. As a result, the printer 104 or 105 stops the acquisition processing at this point because there is no converted data to be acquired. This is because a communication protocol used by the storage service 103 is generally an http or https protocol, the status of which can indicate the existence of the contents but cannot indicate the state of the generation of the contents. More specifically, the printer 104 and 105 cannot recognize a state where the data conversion processing is in process but there is no converted data. Accordingly, a method in which existence of a file indicates the state of the data conversion is required. In the present exemplary embodiment, the state of data conversion in the case described above can be recognized by using the next index file 602.

Now, acquisition processing using the next index file 602 is described. When the index file 601 is generated, the conversion service 101 writes the download URL, for the converted data about the first page for which the conversion has been completed, to the contents portion. Furthermore, when generating the index file 601, the conversion service 101 writes the download URL for the next index file 602 in the nextpage portion of the contents portion. The conversion service 101 generates the next index file 602. When the next index file 602 is generated, the conversion service 101 writes the download URL for the next index file 602 in the nextpage portion of the next index file 602.

Referring back to FIG. 5, in step S502, the conversion service 101 uploads the index file 601, the next index file 602, and the converted data about the first page, described above, to the storage service 103.

In step S505, the printer 104 or 105 acquires the index file 601.

In step S506, the printer 104 or 105 acquires the converted data about the first page based on the converted data download URL written in the contents portion of the index file 601.

In step S507, the printer 104 or 105 acquires the next index file 602 written in the nextpage portion of the index file 601.

In steps S508 and S509, the printer 104 or 105 acquires the next index file 602 written in the nextpage portion of the next index file 602. As described above, the printer 104 or the 105 continues to acquire the next index file 602 while the data conversion processing for the new page has not been completed by the conversion service 101. As a result, the printer 104 or 105 can be in a standby state without terminating the downloading before the data conversion processing is completed.

FIG. 6 is a diagram, subsequent to FIG. 5, illustrating the data conversion processing and the acquisition and print processing for the converted data, for the second page and the following pages.

When the data conversion processing for the new page is completed, in step S510, the conversion service 101 generates the download URL (converted data download URL) of the processed converted data file and a new index file 602a. Here, the conversion service 101 writes the download URL for the index file 602a in the nextpage portion of the new index file 602a.

The conversion service 101 generates the new index file 601a in which the download destinations of the index files are written. In the example described herein, the data conversion processing has been completed for three pages, whereby the download URLs for three pages are written as the converted data download URLs in the index file 601a. As described above, the conversion service 101 sequentially generates the index files at appropriate timing. At that time, the data conversion processing is completed, the download URL of the generated converted data is written in the index file.

In step S511, the conversion service 101 overwrites the old next index file 602 on the storage service 103 with the index file 601a.

In step S512, the conversion service 101 uploads the new index file 602a and the new converted data. The index file 602a functions as a new next index file.

In step S513, the printer 104 or 105 acquires the index file 601a written in the nextpage portion of the next index file 602.

In steps S514 to S516, the printer 104 or 105 acquires the converted data about the second to the fourth pages written in the contents portion of the index file 601a.

In steps S517 to S519, the printer 104 or 105 obtains the next index file 602a written in the nextpage portion of the index file 601a. Then, the printer 104 or 105 continues to acquire the next index file 602a written in the nextpage portion. When there is no page to be converted, the conversion service 101 generates an index file 601b with a blank nextpage portion, and overwrites the next index file 602a with the index file 601b. When the index file 601b is acquired, the printer 104 or 105 acquires and prints the converted data written in the index file 601b. When the acquisition and print processing is completed, the printer 104 or 105 transmits a print completion notification to the print service 102.

As described above, the printer can acquire all the converted data, without terminating the processing even when the converted data does not exist. Accordingly, the data conversion processing executed by the conversion service and the acquisition and print processing for the converted data executed by the printer can be asynchronously carried out. Furthermore, the printer can perform fast printing in the asynchronous data file transmission mechanism utilizing the storage service 103 described above.

Figure 8:
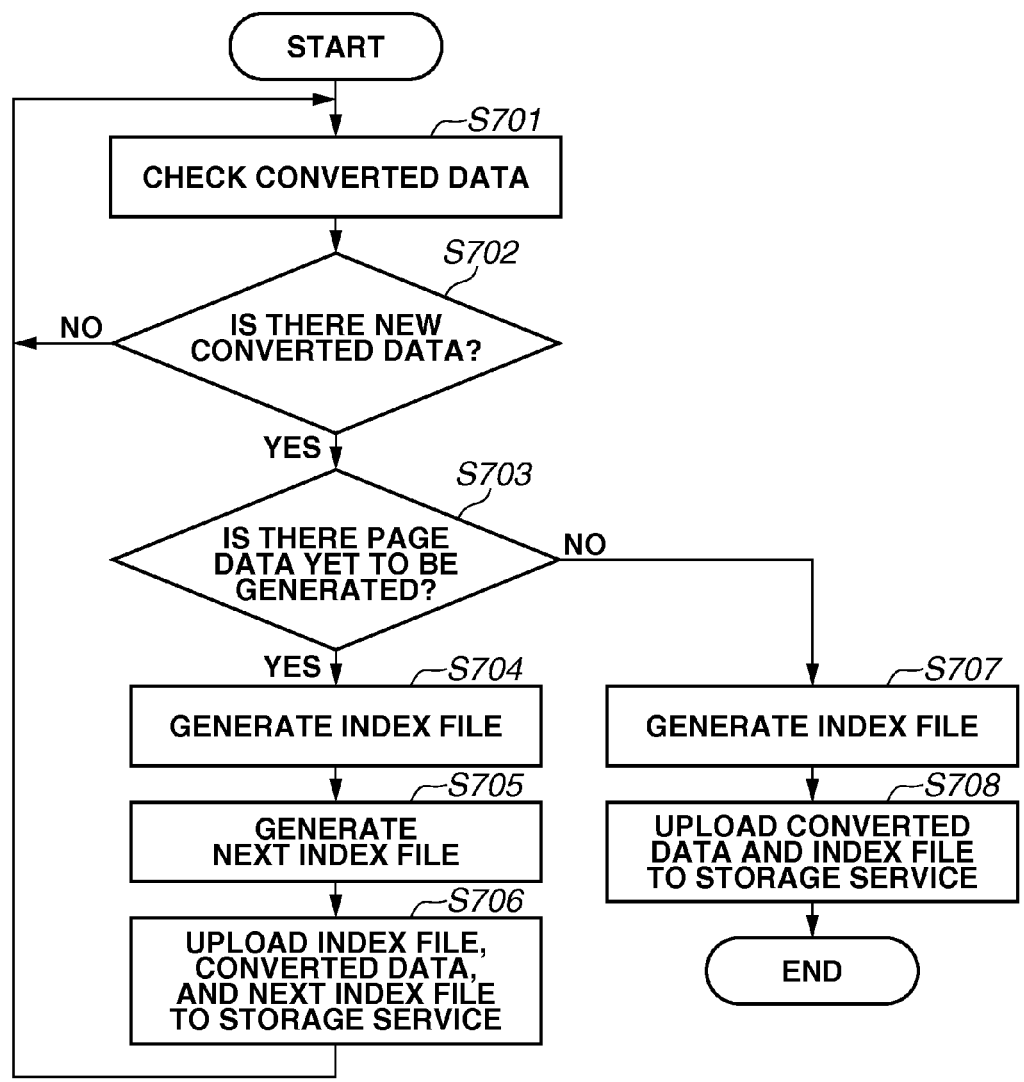
FIG. 8 is a flowchart illustrating the data conversion processing.

Next, data conversion processing executed by the conversion service 101 in steps S501, S502, S510, and S511 described above will be described in detail with reference to FIG. 8.

In step S701, the conversion service 101 checks the converted data. In step S702, the conversion service 101 determines whether there is new converted data. In step S702, when the conversion service 101 determines that there is the new converted data (YES in step S702), the processing proceeds to step S703. In step S703, the conversion service 101 determines whether there is page data yet to be generated, in other words, whether the data conversion processing has been completed for all the pages.

In step S703, when it is determined that there is the page data yet to be generated (YES in step S703), in step S704, the conversion service 101 generates a converted data download URL for the newly generated converted page data. The conversion service 101 generates the index file 601 or 601a in which the download URL for the next index file 602 is written in the nextpage portion.

In step S705, the conversion service 101 generates the index file 602 or 602a. At this time, in the nextpage portion of the index file 602 or 602a, the download URL for the next index file 602 or 602a is written.

In step S706, the conversion service 101 uploads the index file 601 or 601a, the next index file 602 or 602a, and the converted data to the storage service 103.

On the other hand, in step S702, when the conversion service 101 determines that there is no new converted data (NO in step S702), the processing returns to step S701 where the conversion service 101 checks the converted data.

In step S703, when the conversion service 101 determines that there is no data yet to be generated (NO in step S703), the processing proceeds to step S707 where the conversion service 101 generates the index file 601b. As described above, when there is no page data yet to be generated, in other words, when the data conversion processing has been completed for all the pages, the index file 601b with a blank nextpage portion is generated. In step S708, the conversion service 101 uploads the index file 601b and the converted data to the storage service 103.

As described above, in the present exemplary embodiment, data conversion processing executed by the conversion service and the acquisition and print processing for the converted data executed by the printer can be asynchronously carried out. Accordingly, the fast print can be performed by the printer.

Next, a print system as an example of an information processing system according to a second exemplary embodiment will be described. In the first exemplary embodiment, the printer continues to acquire the next index file until the new converted data is generated by the conversion service. In the present exemplary embodiment, the access destination of the printer is switched from the storage server to an alternative server, when the generation of new converted data is not completed within a predetermined time period.

For example, the printer might successively acquire the next index files 602 or 602a before the conversion service 101 generates the new converted data as in steps S508 and S509 or in steps S518 and S519 described above. At this time, the storage service might regard the successive accesses to the same contents data from the same client as an attack from a malicious client, and then locks the access. In the present exemplary embodiment, the access destination of the printer is switched between the storage service and a dummy conversion service as appropriate when the generation of the new converted data by the conversion service is not completed within the predetermined time period. Accordingly, the storage service is prevented from locking the access made by the printer the data conversion processing and the acquisition processing for the data can be asynchronously carried out.

FIG. 9 is a sequence diagram illustrating data conversion processing and processing for acquitting converted data (asynchronous data transmit sequence) according to the present exemplary embodiment. More specifically, the diagram illustrates switching of an access destination to the dummy conversion service. FIG. 10 is a flowchart illustrating how the access destination is switched to the dummy conversion service by the conversion service 101. The description is given below with reference to both FIGS. 9 and 10.

First, in the conversion service 101, a predetermined time period measurement thread is initiated for measuring a predetermined time period when data conversion is performed.

In step S801, the printer 104 or 105 acquires the next index file 602. Then in step S901, when the conversion service 101 determines that the predetermined time period has elapsed (YES in step S901), the processing proceeds to step S902. In step S902, the conversion service 101 determines whether the download URL for the dummy conversion service 810 is written in the nextpage portion of the next index file 602.

In step S902, when the download URL for the dummy conversion service 810 is not written in the nextpage portion of the next index file 602 (NO in step S902), then in steps S802 and S905, the conversion service 101 executes the following processing. The conversion service 101 generates a next index file 603 in which the download URL written in the nextpage portion has been overwritten by that for the dummy conversion service 810.

In step S906, the conversion service 101 uploads the next index file 603 in which the download URL for the dummy conversion service 810 is written to the storage service 103 and a dummy conversion service 810.

In step S803, the printer 104 or 105 acquires the next index file 603 from the storage service 103.

In step S804, the printer 104 or 105 accesses the dummy conversion service 810 for which the download URL is written in the nextpage portion of the acquired next index file 603, and acquires the next index file 603.

On the other hand, in step S902, when it is determined that the download URL of the dummy conversion service 810 is written in the nextpage portion of the next index file 602 (YES in step S902), the conversion service 101 executes the following processing in step S805 and S903. The conversion service 101 generates the next index file 602 in which the download URL for the storage service 103 is written in the nextpage portion.

In step S904, the conversion service 101 uploads the next index file 602 in which the download URL of the storage service 103 is written to the storage service 103 and to the dummy conversion service 810.

In step S806, the printer 104 or 105 acquires the next index file 602 from the dummy conversion service 810.

In step S807, the printer 104 or 105 accesses the storage service 103 for which the download URL is written in the nextpage portion of the acquired index file 602, and acquires the next index file 602.

As described above, the present exemplary embodiment provides the same advantageous effects as the first exemplary embodiment. Furthermore, in the present exemplary embodiment, the successive accesses to the storage server, performed by the printer, while the generation of the new converted data by the conversion service is in process, can be distributed to another service. Accordingly, the successive accesses to the same contents data performed by the same client can be prevented from being locked by the storage service.

(Other Embodiments)

Aspects of the present invention can be implemented by processing for supplying a program for implementing one or more functions of the exemplary embodiments described above to a system or an apparatus through a network or a storage medium, and reading out and executing the program by one or more processors in a computer of the system or the apparatus, or may be implemented by a circuit (for example, an application specific integrated circuit (ASIC)) that implements one or more functions.

Aspects of the present invention are not limited to the exemplary embodiments of the present invention described above, and can be changed and modified in various ways without departing from the essence of the aspects of the present invention.

Additional embodiments can also be realized by a computer of a system or apparatus that reads out and executes computer executable instructions recorded on a storage medium (e.g., non-transitory computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that the aspects of the present invention are not limited to the disclosed exemplary embodiments. The scope of the following claims is to be accorded the broadest interpretation so as to encompass all such modifications and equivalent structures and functions.

This application claims the benefit of Japanese Patent Application No. 2014-251896, filed Dec. 12, 2014, which is hereby incorporated by reference herein in its entirety.

What is claimed is:

1. An information processing system comprising:
a reception unit configured to receive a request for data processing;
a generation unit configured to generate, in a sequential manner, a file list in which reference information about a processed file as a result of the data processing is written; and
an acquisition unit configured to acquire the file list and the processed file based on a written content in the file list,
wherein, in a case where the data processing is not fully completed when the file list is generated, the generation unit is configured to generate another file list in which reference information about a next processed file is written, and write reference information about the another file list in the file list,
wherein, in a case where a newly processed file is generated, the generation unit is configured to overwrite the another file list with reference information about the newly processed file, and
wherein, in a case where the file list includes the reference information about the another file list, the acquisition unit is configured to continue to acquire the another file list until the another file list is overwritten with the reference information about the newly processed file.

2. The information processing system according to claim 1, wherein the generation unit is configured to write address information about the another file list as the reference information about the another file list, until the another file list is overwritten with the reference information about the newly processed file.

3. The information processing system according to claim 1, wherein the generation unit is configured to generate the file list of a first time when the processed file of a first time as a result of the data processing is generated.

4. The information processing system according to claim 1,
wherein, in a case where the data processing is fully completed, the generation unit is configured to overwrite the file list with the another file list including no reference information, and
wherein, in a case where the file list includes no reference information about the another file list, the acquisition unit is configured to determine that the data processing has been fully completed.

5. The information processing system according to claim 1,
wherein the generation unit is configured to store the file list and the processed file in a storage device, and
wherein the acquisition unit is configured to acquire the file list and the processed file from the storage device.

6. The information processing system according to claim 5,
wherein the generation unit is configured to write address information about the another file list in the another file list as the reference information until the another file list is overwritten with the reference information about the newly processed file, and
wherein, in a case where the another file list is not overwritten with the reference information about the newly processed file within a predetermined time period, the generation unit is configured to generate the another file list in an alternative storage device.

7. A server apparatus comprising:
a reception unit configured to receive a request for data processing; and
a generation unit configured to generate, in a sequential manner, a file list in which reference information about a processed file as a result of the data processing is written,
wherein, in a case where the data processing is not fully completed when the file list is generated, the generation unit is configured to generate another file list in which reference information about a next processed file is written, and write reference information about the another file list in the file list,
wherein, in a case where a newly processed file is generated, the generation unit is configured to overwrite the another file list with reference information about the newly processed file,
wherein the file list is acquired from an external information processing apparatus, and
wherein, in a case where the file list includes reference information about the another file list, acquisition of the another file list continues until the another file list is overwritten with the reference information about the newly processed file.

8. A method for controlling an information processing system, the method comprising:
acquiring a request for data processing;
generating, in a sequential manner, a file list in which reference information about a processed file as a result of the data processing is written; and
acquiring the file list and the processed file based on a written content in the file list,
wherein, in a case where the data processing is not fully completed when the file list is generated, another file list in which reference information about a next processed file is written is generated, and reference information about the another file list is written in the file list,
wherein, in a case where a newly processed file is generated, the another file list is overwritten with reference information about the newly processed file, and
wherein, in a case where the file list includes the reference information about the another file list, acquisition of the another file list continues until the another file list is overwritten with the reference information about the newly processed file.

* * * * *